United States Patent [19]
Lynch et al.

[11] Patent Number: 5,285,406
[45] Date of Patent: Feb. 8, 1994

[54] HIGH SPEED MIXED RADIX ADDER

[75] Inventors: Thomas W. Lynch; Steven D. McIntyre, both of Austin, Tex.

[73] Assignee: Advanced Micro Devices, Inc., Sunnyvale, Calif.

[21] Appl. No.: 991,082

[22] Filed: Dec. 14, 1992

Related U.S. Application Data

[63] Continuation of Ser. No. 840,622, Feb. 21, 1992, abandoned, which is a continuation of Ser. No. 746,290, Aug. 13, 1991, abandoned, which is a continuation of Ser. No. 503,818, Apr. 2, 1990, abandoned.

[51] Int. Cl.$^5$ .................................................. G06F 7/50
[52] U.S. Cl. ...................................... 364/788; 364/787
[58] Field of Search ................................. 364/787–788

[56] References Cited

U.S. PATENT DOCUMENTS

| | | | |
|---|---|---|---|
| 3,100,835 | 8/1963 | Bedrij | 364/788 |
| 3,316,393 | 4/1967 | Ruthazer | 364/788 |
| 3,553,446 | 1/1971 | Kruy | 364/788 |
| 3,993,891 | 11/1976 | Beck et al. | 364/788 X |
| 4,573,137 | 2/1986 | Ohhashi | 364/788 |
| 4,682,303 | 7/1987 | Uya | 364/788 |
| 4,761,760 | 8/1988 | Tomoji | 364/788 |
| 4,764,888 | 8/1988 | Holden et al. | 364/788 |

OTHER PUBLICATIONS

Becker, et al. "Lecture Notes in Computer Science", 5th Annual Symposium on Theoretical Aspects of Computer Science, Bordeaux, France (1988); pp. 18–28.
Cavanagh, Digital Computer Arithmetic, McGraw-Hill, (1984), pp. 107–117.
Guyot, et al. "A Way to Build Efficient Carry-Skip Adders", IEEE Transactions on Computers C-36:10, (1987), pp. 1144–1151.
Hwang, et al. "A 31 ns 32b CMOS Adder in Multiple Output Domino Logic", ISSCC 1988 Solid State Circuits Conference digest of technical papers (1988).
Ling, "High-Speed Binary Adder", IBM Journal of Research and Development, (May, 1981), pp. 156–166.
CMOS VSLI Design, Addison-Wesley (1985), pp. 310–332.

Primary Examiner—Tan V. Mai
Attorney, Agent, or Firm—Johnson & Gibbs

[57] ABSTRACT

A high speed adder suitable for incorporation into electronic digital processing circuits includes at least one first independent adder assuming a carry in of zero (0); at least one second independent adder assuming a carry in of one (1); carry prediction logic circuitry for producing carries for the first and second independent adders, which carry prediction logic circuitry is operable simultaneously with the first and second independent adders; and a final mux for producing a correct result based upon outputs received from the first and second independent adders and the carry prediction logic circuitry.

18 Claims, 8 Drawing Sheets

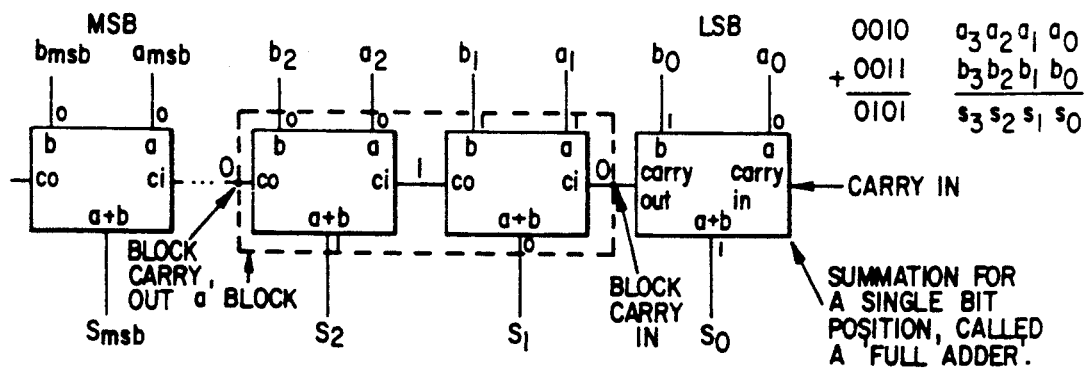
FIG. 1 (PRIOR ART) A RIPPLE CARRY ADDER AND AN EXAMPLE BLOCK. SHOWING ADDITION OF 0010 + 0011
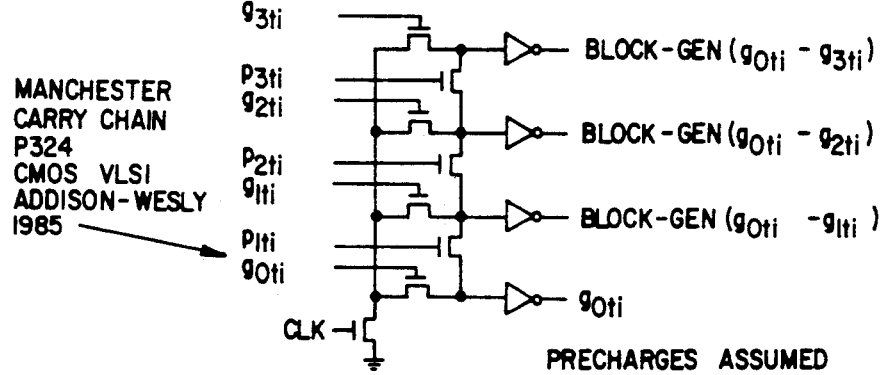
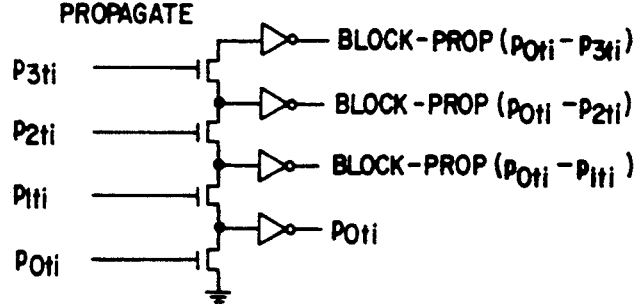
FIG. 2 PROPAGATE AND GENERATE (PRIOR ART)

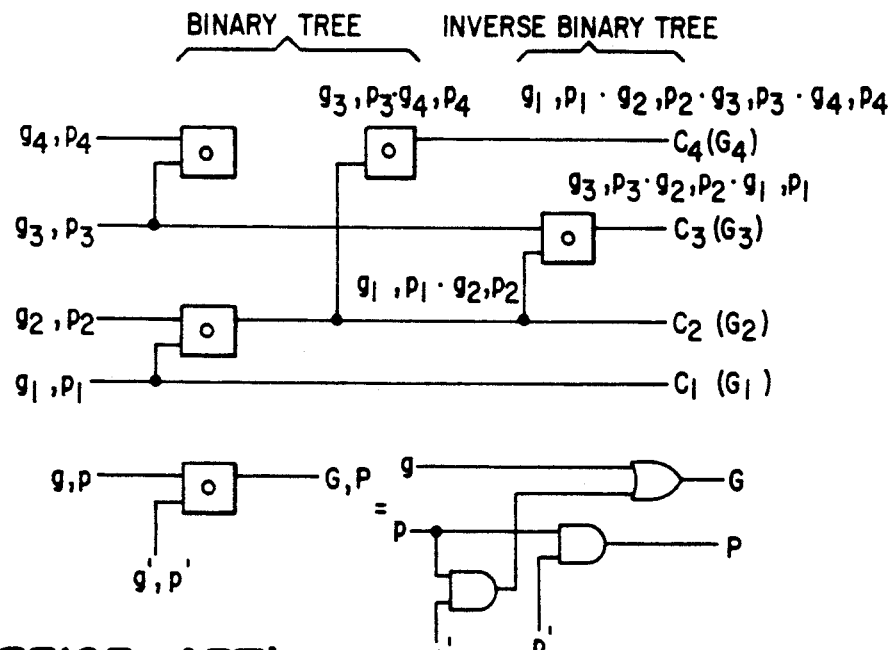
FIG. 5(PRIOR ART)
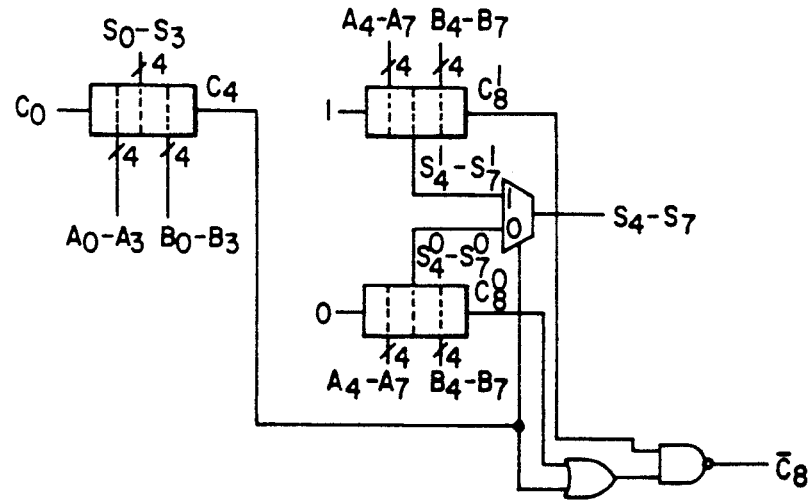
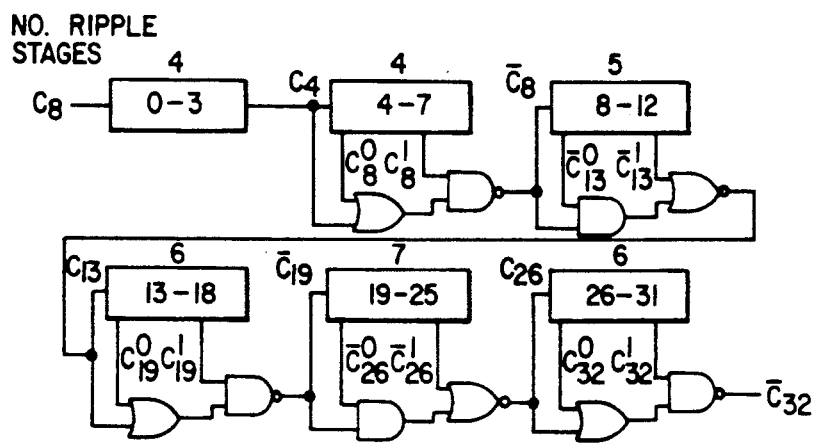
FIG. 6(PRIOR ART)

HIGH SPEED MIXED RADIX ADDER

This is a continuation of application Ser. No. 07/840,622, filed Feb. 21, 1992 now abandoned, which is a continuation of application Ser. No. 07/746,290, filed Aug. 13, 1991 now abandoned, which is a continuation of application Ser. No. 07/503,818, filed Apr. 2, 1990 now abandoned.

CROSS REFERENCE TO RELATED APPLICATIONS

This application is related to the following U.S. Patent Applications:

| SERIAL NO./U.S. PAT. NO. | TITLE | INVENTOR |
|---|---|---|
| 07/503,817/5,053,631 | Pipelined Floating Point Processing Unit | Perlman, et al. |
| 07/503,819/5,058,048 | Normalizing Pipelined Floating Point Processing Unit | Gupta, et al. |
| 07/504,127/5,128,888 | Arithmetic Unit Having Multiple Accumulators | Tamura, et al. |
| 07/505,351 | Apparatus and Method For Collecting Boolean Conditions of Multiple Operations | McMinn, et al. |
| 07/505,350 07/806,820/5,206,828 | A Special Carry Save Adder For High Speed Iterative Division | Shah, et al. |
| 07/503,822/5,095,458 | Radix 4 Carry Lookahead Tree and Redundant Cell Therefor | Lynch, et al. |
| 07/504,324/5,128,891 | High Speed Divider With Square Root Option | Lynch, et al. |

All cross references are filed on even data herewith and assigned to the assignee of the present invention which are all hereby incorporated by this reference thereto.

BACKGROUND OF THE INVENTION

1. Field of the Invention

The present invention relates to circuits for high speed digital electronic addition.

2. Description of Related Art

In binary place value addition two operands, represented in the binary place value code, are summed to produce a result, also in binary place value code. Each operand, and the result, is an array of bits. In the binary place value code, the position of a bit in the array determines its power of two weight; hence, value=sum (bit$\times 2^{\wedge}$ pos). The bit with the least weight in determining the value of a representation is called the least significant bit, or LSB. Similarly, the bit with the greatest weight is called the most significant bit, or MSB. Other number systems have better properties for addition, but they suffer from other problems, so virtually every computer on the market today uses the binary place value code.

In the addition method done by hand, the sum is formed for the LSB position, a carry is possibly propagated to the next bit position, and the process is repeated for successive bit positions until each bit in the result has been calculated. This method is know as 'ripple carry' addition to those skilled in the art, as shown in FIG. 1. Ripple carry addition is inherently slow because of its serial nature.

Traditionally, addition has been speeded up by using one of the following techniques, as described in CMOS VLSI Design, Addison-Wesley 1985: Carry lookahead, Manchester Carry Lookahead, Binary Carry Lookahead trees, and Carry Select Addition. Another technique, as described in the 5th Annual symposium on Theoretical Aspects of Computer Science, STACS 1988, is Condition Sum Addition. Still another technique is the Multiple Output Domino Logic adder described in the 1988 Solid-State Circuits Conference Digest of Technical Papers.

Each of these adders, except the Carry Select, and the Conditional Sum Adder, is based on the concepts of carry propagation, carry generation, and carry kill (see FIG. 2); which are well understood by people skilled in the art. A carry is said to 'propagate' through a bit position if a carry into the summation operation for a given bit position is followed by a carry out of the given bit position, while the summation for the given bit position does not produce a carry out when no carry is input. A carry is said to be 'generated' from a given bit position if the summation for the given position produces a carry out independent of a carry in. A carry is said to be 'killed' in a bit position if a carry does not propagate through the bit. As known by people skilled in the art, and shown in FIG. 2, the propagate and generate signals may be found without actually doing the summation.

A grouping of adjacent sum functions, adjacent propagate functions, or adjacent generate functions, may be called a 'block', an example of which is shown in FIG. 1. The terms propagate, generate, and kill, may be applied to blocks. A carry is said to propagate through a given block if a carry into the given block's LSB summation is followed by a carry out of the given block's MSB summation. A block is said to generate a carry if the said block's MSB summation produces a carry out, independent of carries into the block's LSB. It is known by anyone skilled in the art that a block can only generate if a given bit position in the block generates and all bits between the given bit and the block's MSB propagate, as done in the Manchester Carry Chain described in CMOS VLSI, Addison Wesley, 1985.

An overview of carry look-ahead adder theory is given in Digital Computer Arithmetic, by J. J. F. Cavanagh, p. 107–117, McGraw-Hill (1984). The CLA speeds computation of the carries by using redundant logic. A block is defined for a given bit position such that the LSB of the block corresponds to the LSB of the add, and the MSB of the block corresponds to the given bit position. Hence, there are as many blocks as there are bits positions in the result minus 1, as shown in FIG. 3. An additional block is needed if a carry out is required. Each block has only the input operands and the carry into the add as inputs, and one carry as an output. Theoretically, any single logic function may be performed in two gate delays, so the time to produce a sum in a carry lookahead adder is theoretically a constant four gate delays; however, the finite gain of real gates limits the amount of load that any one gate can drive in a given amount of time, so more gate delays must be added. Also, since the input operands themselves are driven by gates, the number of carry blocks that can be driven, and hence the number of bits the result may have, is also limited. The carry lookahead adder becomes relatively slow for results sizes beyond a few bits. The performance of the carry lookahead adders shows that loading considerations of real gates determines add time, not the theoretical number of gate delays. A recent adder invented by Ling, presented in the IBM Journal of Research and Development, May 1981, reduces the load from the output of the propage and generate state by one gate input per bit, per block. Although this method alleviates the loading problem, the CLA adder remains relatively inefficient for adds of more than several bits.

The Manchester Carry Lookahead Adder, FIG. 4, speeds addition by allowing carries to skip blocks that propagate. To apply this method, an add is broken into a series of blocks, such that no carry propagation logic is duplicated. Then, all of the bit propagates for a given block are ANDed together to determine if the given block will propagate. If the block will propagate, then a bypass is turned on which will route any carries into the LSB of the block directly to the output of the block's MSB. This method works well for certain size adders in CMOS; however, its performance is still linearly related to the size of the add. In attempts to alleviate this problem multiple levels of skip are added, as explained in the IEEE Transactions on Computers Volume 36. For adds greater than 32 bits, this method can only approach the speed of a Binary Lookahead Carry adder, and it will be significantly slower than the adder being presented in this application because of theoretical and practical reasons.

The Binary Lookahead Carry tree, FIG. 5 has gate delays related to the log base 2 of the add length, plus overhead. As in the case with the carry lookahead adder, circuit loading prevents the realization of the log base 2 gate delays for large trees, i.e., trees for adds bigger than about 8 bits. Also, as is known to anyone skilled in the art, the tree becomes large and inefficient to layout for large adds. The MODL gate adder, described in the 1988 IEEE Solid-State Circuits Conference Digest of Technical Papers, is an attempt to alleviate some of these problems and allows for a log base 2×linear performance (less than log base 2) for larger adds.

A Carry Select Adder, shown in FIG. 6, is based on the principle of partitioning the add into three blocks. The first block adds the bottom half of two operands. The second block adds the top half of the operands while assuming a carry in from the first block of zero. The third block adds the top half of the operands while assuming a carry in from the first block of one. When the carry from the first block is calculated it is used to pick the correct top half of the result by selecting the sum out of block two, or the sum out of block three via a two to one mux. When carry select adders are strung out in series they have linear performance related to the number of sections, plus the add time of the first section. For large adds, this type of adder is relatively slow, but it is small.

The Conditional Sum Adder is a recursively applied Carry Select Adder. An add is broken into many redundant blocks of two, then one set is picked so that only half as many possible sums remain. The process of halving the possible sums is continued in multiple stages until only the result remains. This adder has a log base 2 performance; however, it is even larger than the BLC adder. Since the summation is calculated along with the carries in each stage, the summation logic is unnecessarily reproduced many times. Also, the summation overhead makes this adder slower than the BLC adder.

Because adders form the heart of many digital circuits, and they are a major contributor to the required cycle time of RISC microprocessors, there has continued to be a need for faster adders, as provided by the present invention.

SUMMARY OF THE INVENTION

The present invention provides an improved high speed adder including at least one first independent adder, at least one second independent adder; and means for producing carries for the at least one first independent adder and the at least one second independent adder, the means for producing carries operable simultaneously with the at least one first independent adder and the at least one second independent adder.

In embodiments of the present invention, the at least one first independent adder assumes a carry of one and the at least one second independent adder assumes a carry of zero.

According to the teachings of the present invention a high speed adder can include a plurality (e.g., eight) of first independent adders and, similarly, a plurality (e.g., eight) of second independent adders.

Certain embodiments of the present invention also include a mux that selects the proper result from the plurality of first and second adders. This mux can operate on a sparse carry principle, rather than, e.g., directly using carries.

In further embodiments of the present invention the means for producing carries can employ radix, e.g., radix-4, logic.

The present invention also provides a method of effecting electronic digital addition of first and second operands including the steps of adding the first and second operands assuming a carry in of zero; adding the first and second operands assuming a carry in of one; predicting carries; and selecting a proper result based upon the results of the addition assuming a carry in of zero, the addition assuming a carry in of one, and the predicted carries.

Accordingly, it is an object of the present invention to provide a faster and/or less expensive adder.

It is another object of the present invention to provide an adder circuit with relatively few gate delays.

Yet another object of the present invention is to provide an adder circuit that scales well.

Still yet another object of the present invention is to provide a high speed adder that uses relatively little space.

A further object of the present invention is to provide an adder circuit which approaches the performance of a carry prediction block which operates on a fraction of the number of carry bits as the whole add.

BRIEF DESCRIPTION OF THE DRAWINGS

Other objects, advantages and novel features of the present invention will become apparent from the following detailed description of the invention when considered in conjunction with the accompanying drawings wherein:

FIGS. 1-8 are various prior configurations, previously discussed;

FIG. 7 is a block diagram of a system incorporating the present invention in parts thereof;

FIG. 8 is a block diagram of the processor shown in FIG. 7;

DETAILED DESCRIPTION OF THE INVENTION

Figure 3:
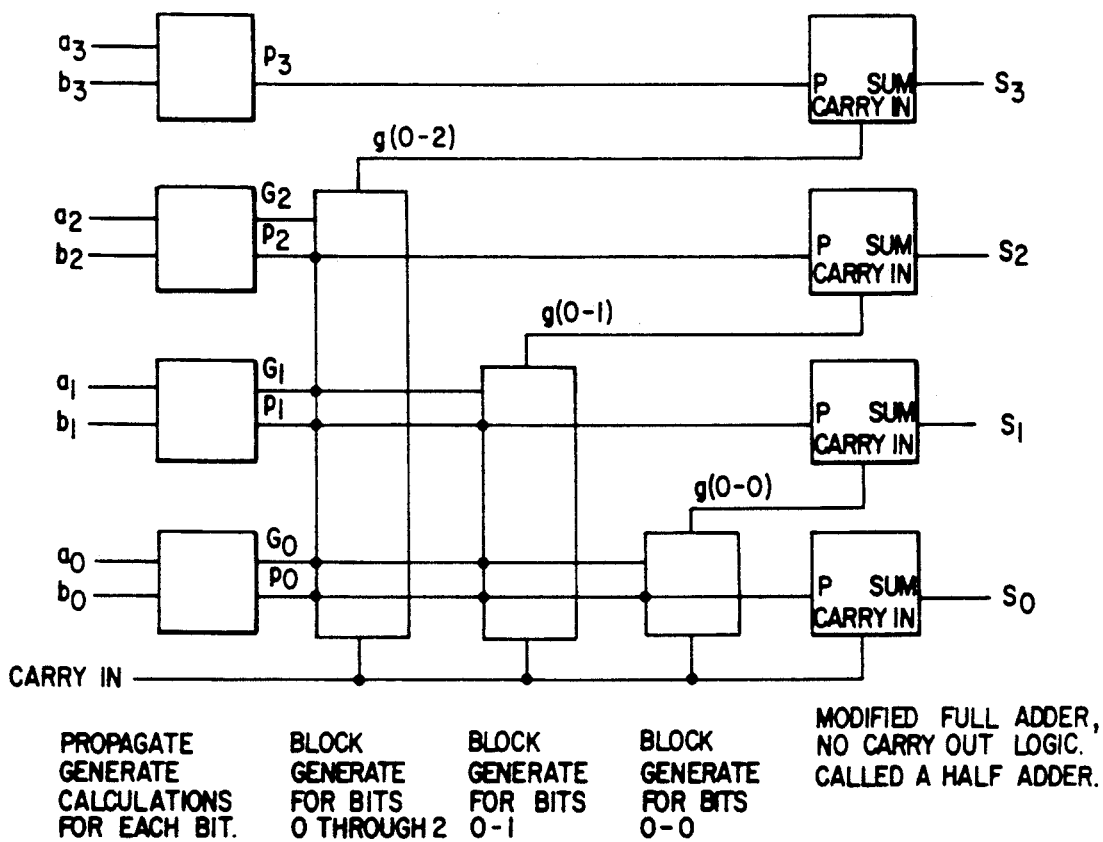
Figure 4:
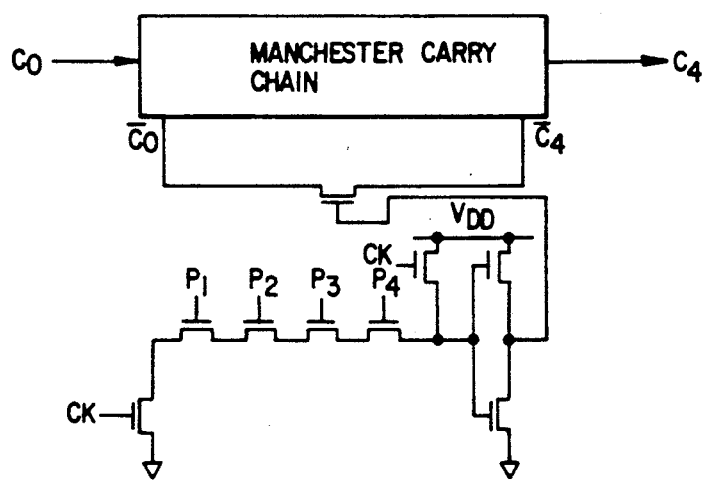
Figure 7:
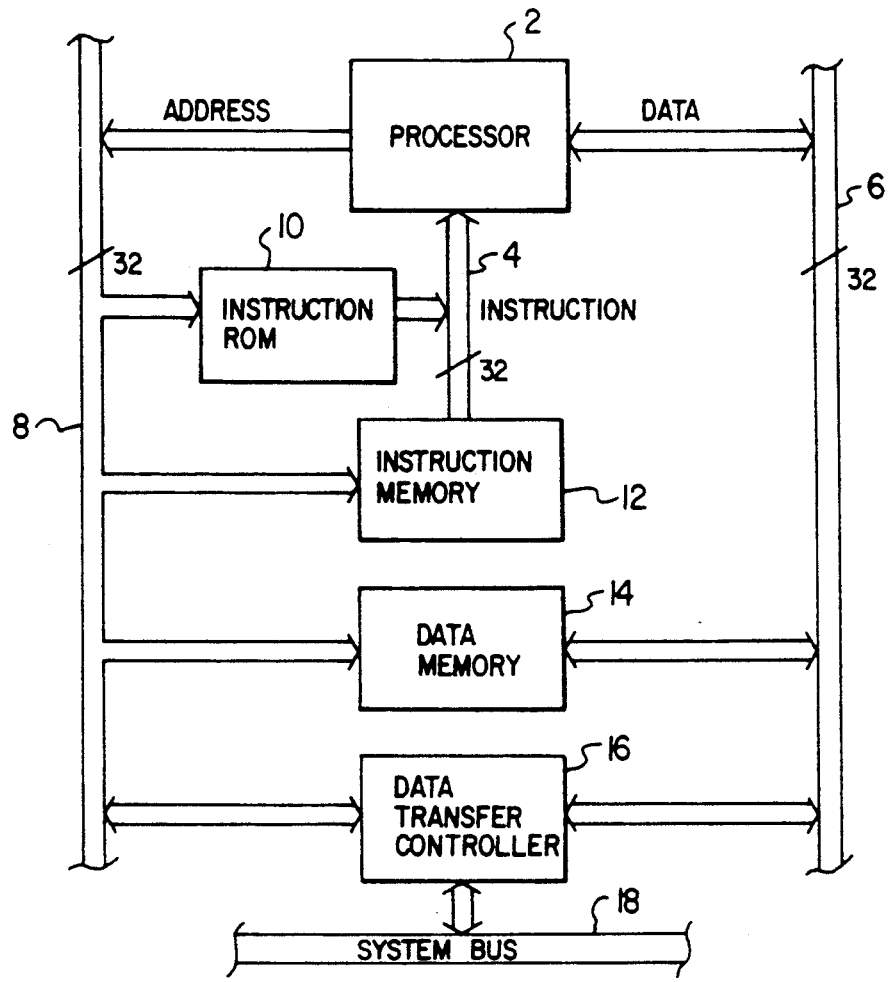

Referring now to FIG. 7, a simplified system diagram of a computing system including a processor 2 is shown therein. The purpose of this diagram, as well as several subsequent diagrams, is to illustrate an environment in which an adder according to the teachings of the present invention may be usefully incorporated.

Processor 2 accesses external instructions and data using three non-multiplexed buses. These buses may be referred to collectively as a channel. The channel comprises a 32-bit bus 4 for instruction transfers, a second 32-bit bus 6 for data transfers, and a third address bus 8 which is shared between instruction and data accesses. The address bus 8 is pipelined, so that it can be released before an instruction or data transfer is completed. This allows a subsequent access to begin before the first has completed, and allows the processor 2 to have two accesses in progress simultaneously.

The overall system shown in FIG. 7 may also be seen to comprise an instruction ROM 10 and instruction memory 12, both operatively connected between the address bus 8 and instruction bus 4. Additionally, a data memory 14 and data transfer controller 16 are shown to be operatively connected between the address bus 8 and data bus 6. Further, the data transfer controller 16 is also operatively connected so as to send signals onto, and receive signals from, a system bus 18.

Figure 8:
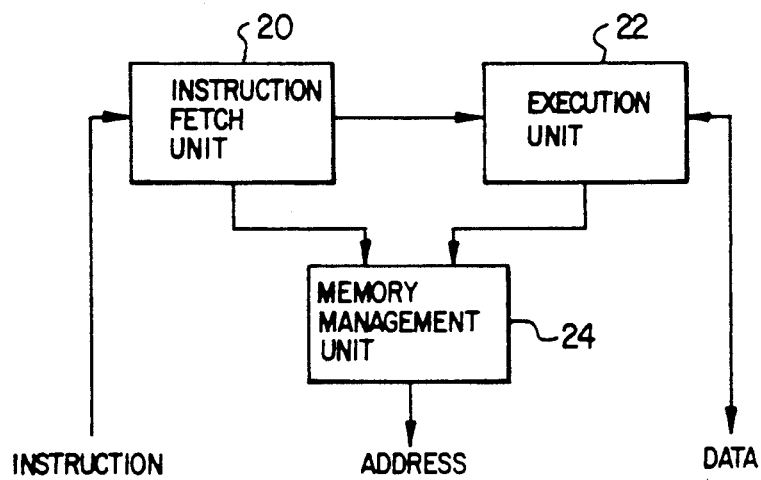

Referring now to FIG. 8, a data flow diagram of the processor 2 is shown therein so that a better understanding of that processor 2 may be obtained.

Processor 2 implements a four-stage pipeline for instruction execution, the four stages being "fetch", "decode", "execute" and "write-back". The instruction fetch unit 20 of processor 2 fetches instructions, and supplies instructions to other functional units. The unit 20 incorporates an instruction prefetch buffer, a branch target cache, and a program counter unit. These subunits will be discussed further below with reference to FIG. 9. All components of the instruction fetch unit 20 operate during the fetch stage of the processor pipeline.

Processor 2 also includes an execution unit 22. The execution unit 22 includes a register file, an address unit, an arithmetic/logic unit, a field shift unit, a prioritizer, and a floating point processing unit. These subunits, like the subunits of the instruction fetch unit 20, are also discussed further below with reference to FIG. 9. The register file and address unit operate during the decode stage of the pipeline. The arithmetic/logic unit, field shift unit, and prioritizer operate during the execute stage of the pipeline. The register file also operates during the write-back stage.

Still further with reference to FIG. 8, the processor 2 may be seen to include a memory management unit 24. The memory management unit 24 performs address translation and memory-protection functions for all branches, loads and stores. The unit 24 operates during the execute stage of the pipeline, so the physical address that is generates is available at the beginning of the write-back stage.

Interconnection of the units 20, 22 and 24 in processor 2, as well as their interfaces with system buses, are also shown in FIG. 8.

Figure 9:
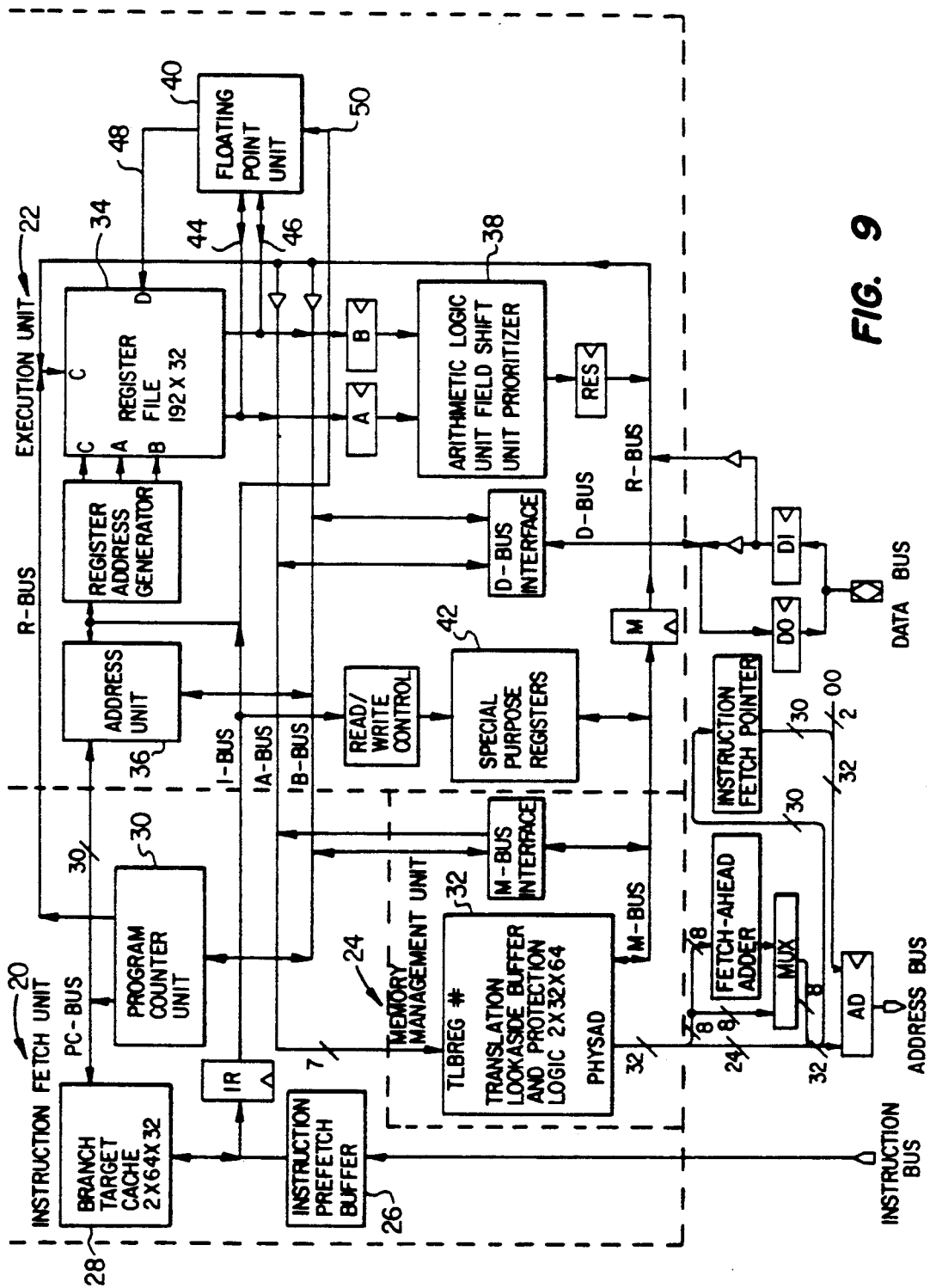
FIG. 9 is a more detailed block diagram of the processor of FIG. 8.

Referring now to FIG. 9, even further details regarding the subcomponents of the processor 2 are shown diagrammatically. As previously mentioned, the instruction fetch unit 20 may be seen to comprise an instruction prefetch buffer 26, a branch target cache 28, and a program counter unit 30. As also previously mentioned, the memory management unit 24 may be seen to comprise means 32 for performing address translation and memory protection functions for all branches, loads and stores. Finally, the execution unit 22 may be seen to comprise a register file 34, an address unit 36, an arithmetic/logic unit 38, a field shift unit (also designated by reference numeral 38), a prioritizer (also designated by reference numberal 38), and a floating point processing unit 40. Although various other elements (e.g., special purpose registers 42) and interconnection details are shown in FIG. 9, because they are only peripherally related to the present invention, and because the diagram alone is sufficiently communicative to those skilled in the art to understand processor 2 well, further details regarding all units other than the floating point unit 40 and other elements to which it is operatively connected are not set forth herein.

Several noteworthy aspects of the floating point unit 40 may be seen with reference to FIG. 9. Recognizing that the floating point unit 40 manipulates A and B operands, those A and B operands come from the register file 34 via A and B buses 44, 46, respectively. Results of manipulations, e.g., calculations, by the floating point unit 40 are written into the register file via result bus 48. Also, instructions for operation of the floating point unit 40 are transmitted thereto via processor instruction bus 50.

Figure 10:
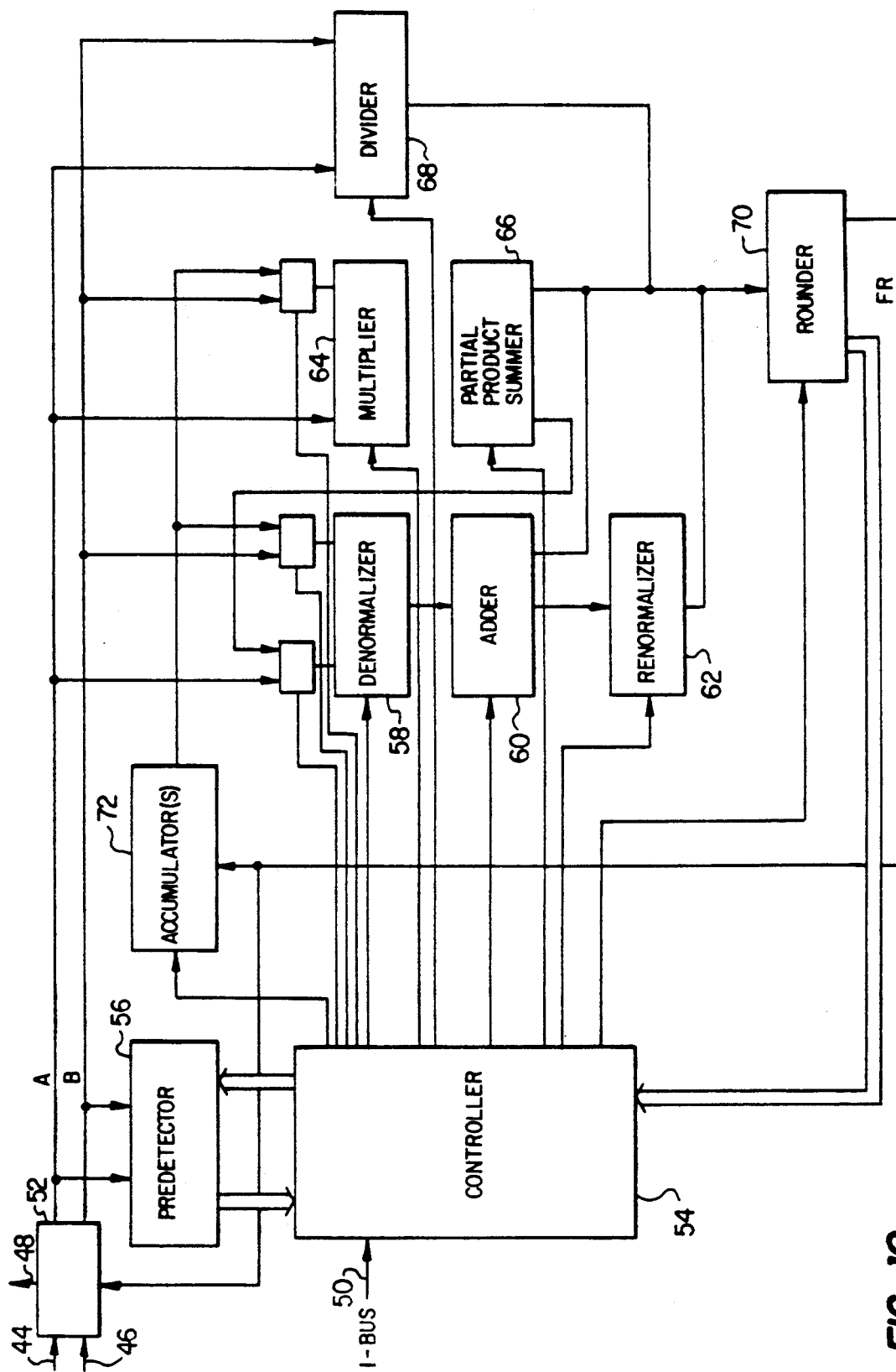
FIG. 10 is a block diagram of a floating point unit incorporating the present invention in parts thereof.

Referring now to FIG. 10, various subcomponents of a pipelined floating point processing unit constructed in accordance with the teachings of the present invention may now be seen.

The various interface points discussed above with reference to FIG. 9 are similarly shown and labelled in this FIG., i.e., operands from the register file are fed into the floating point unit via A and B buses 44, 46, results leave the floating point unit via the result bus 48, and instructions are transmitted to the floating point unit via the instruction or I-bus 50. With special reference to FIG. 10, the A bus, B bus and result bus may be seen to be operatively connected to an interface unit 52 within the floating point unit, whereas the I-bus is operatively connected to a controller 54 therein.

It is well-known that when numbers for processing, i.e., A and B operands, are input to a floating point unit such as floating point unit 40, the floating point unit performs the desired (or instructed) arithmetic operations, and outputs the result on a result bus such as bus 48. Floating point units such as floating point unit 40 may process both floating point and integer numbers. Various floating point formats may be supported, such as 32 bit (single precision), and 64 bit (double precision). Additionally, the floating point unit 40 may handle conversion of integers to floating point, and the reverse, as well as support IEEE, DEC and IBM formats. Each of the above aspects of floating point unit 40 is discussed further in the related cases referred to above and incorporated herein by reference.

Referring still further to FIG. 10, those skilled in the art should appreciate the function and operation of most of the various floating point unit subcomponents shown therein. Those subcomponents which operate in a generally conventional individual manner, and are thus not discussed in detail herein, include predetector 56, denormalizer 58, multifunction unit 60, renormalizer 62, multiplier 64, partial product summer 66, divider 68, rounder 70, and accumulator(s) 72. Some very important aspects of these subcomponents and the interaction thereof exist however, and are discussed at length in the related cases, to which the reader is urged to refer.

Figure 11:
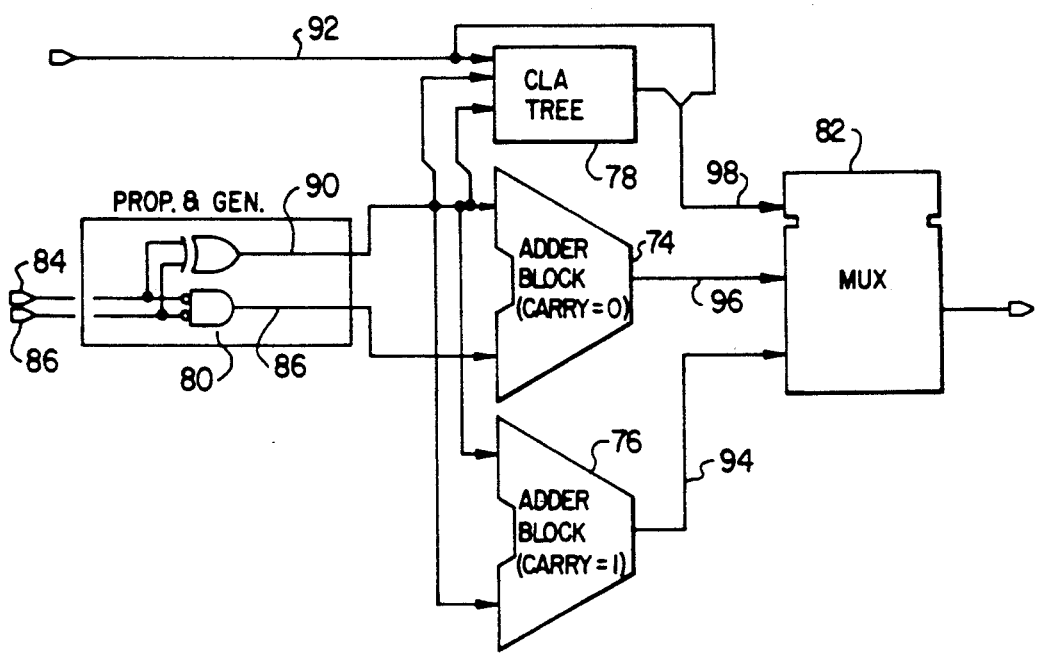
FIG. 11 is a block diagram of an adder circuit according to the teachings of the present invention.

Referring now to FIG. 11, a block diagram of an adder according to the teachings of the present invention is shown therein. As should be appreciated by those skilled in the art, the adder shown in FIG. 11 may be incorporated into the multifunction unit 60, multiplier 64, and/or divider 68 of the floating point unit shown in FIG. 10. Additionally, the adder shown in FIG. 11 may be seen to comprise at least one first adder block 74, at least one second adder block 76, a carry prediction block 78, for example, a carry lookahead tree, a propagate and generate block 80, and a mux 82, each of which is discussed in further detail below.

Referring first to the propagate and generate block 80, as should be well understood by those skilled in the art, this block 80 generates propagate and generate signals, as appropriate, based upon input operands.

Continuing to refer to FIG. 11, it may be seen that the propagate and generate signals produced by block 80 are transmitted to blocks 78, 74 and 76 of the adder. In the carry prediction block 78, an embodiment of which is discussed at length in a related case cited above, those two signals are combined with the carry input of the adder, provided on line 92, to produce carries for the block boundaries.

Since only carries on the block boundaries are required from the prediction logic, the prediction logic is simpler and has less internal loading. This less internal loading, according to the teachings of this patent, will allow the carry prediction circuit to approach its theoretical maximum speed. In addition, because only the block boundary carries are required from the prediction logic, the prediction logic will be substantially smaller; hence, according to the teachings of this patent, the prediction logic will be able to produce carries in theoretically less time as well.

In the embodiment of the invention shown in FIG. 11, adder blocks 74 and 76 are virtually identical sets of 8 independent adders with a small number of inputs. An important difference, however, between adder block 74 and adder block 76 is that the former block assumes a carry in of zero (0) and the latter block assumes a carry in of one (1). The results of all of the independent adders may be seen in FIG. 7 to be forwarded from the adder blocks 74 and 76 to the mux 82 via lines 94 and 96. Additionally, the carry lookahead tree signal is also forwarded to mux 82 via line 98.

Block 82 is a mux that picks the correct result from the various adders. That is, if a carry in of zero would be appropriate, the result of block 74 would be picked by mux 82; and if a carry in of 1 would have been correct, the mux 82 picks the output result of block 76. In an embodiment of the present invention employing 8 independent adders in each of blocks 74 and 76, a mux that would perform satisfactorily would be an 8×[(1 of 2)×8] mux.

Based on the foregoing, those skilled in the art should see that the adder blocks (74 and 76) may evaluate simultaneously with the very fast carry prediction block (78), so add times are either 1 mux delay plus the very fast carry prediction block, or the add time at the slowest chain in the summation blocks. Those skilled in the art should appreciate that this is a very fast adder. An embodiment of the present invention along the lines of FIG. 11 has been constructed and has been found to be faster and less expensive than prior art configurations. Additionally, the constructed circuit has few gate delays: log4 n+2. Additionally, the constructed configuration may be easily scaled and it does not use too much area. In fact, it tends to use less than 450 microns, in an old 1 u micron CMOS process, for 64 bits to perform 4.0 nanoseconds adds.

Figure 12:
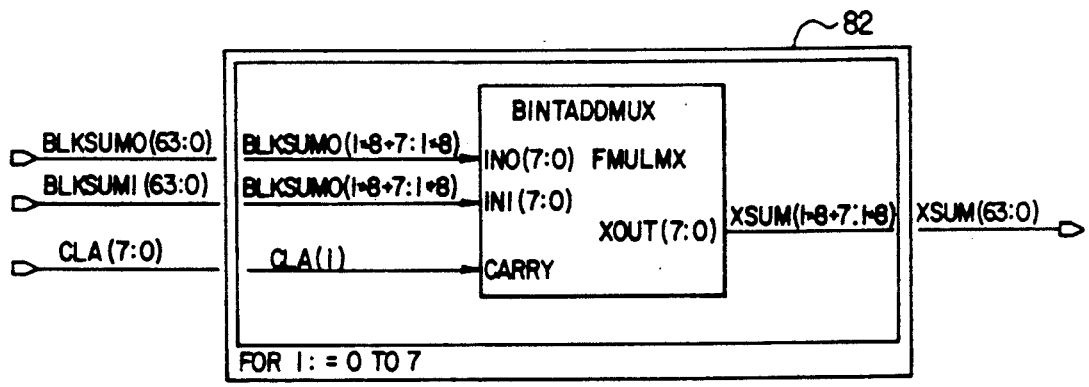
FIG. 12 is a block diagram of a portion of the adder circuit of FIG. 11.
Figure 13:
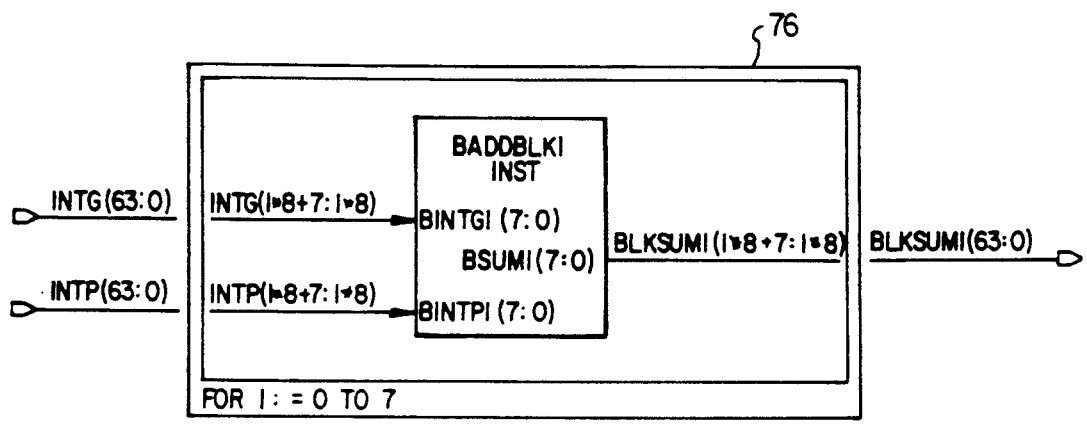
FIG. 13 is a block diagram of a portion of the adder circuit of FIG. 11.
Figure 14:
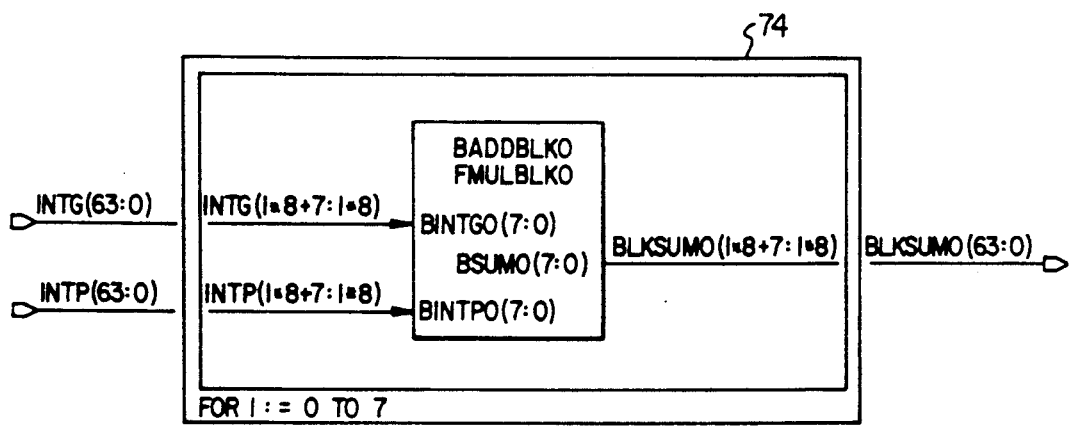
FIG. 14 is also a block diagram of a portion of the adder circuit of FIG. 11.

To assist those skilled in the art in fully understanding the present invention, in FIGS. 12, 13 and 14, further details regarding blocks 82, 76 and 74, respectively, are presented. The various signal configurations shown in FIGS. 12-14 correspond to signals actually employed in a product made by the assignee of the present invention, specifically, the AM29050. As those skilled in the art should now fully appreciate, FIG. 12 shows an 8×[(1 of 2)×8] mux block. FIG. 13 shows an 8 bit adder assuming a carry in of 1. Of course, the notation at the bottom of this FIG. indicates that in embodiments of the present invention there would be 8 such adders forming an adder block 76. Similarly, FIG. 14 shows an 8 bit adder assuming a carry in of zero and in an embodiment of the present invention there may be 8 such adders in an adder block 74.

Based on the foregoing, those skilled in the art should appreciate that the present invention provides a high speed adder that offers tremendous advantages over the present art. These advantages include speed, low cost, few gate delays, scaleability, and use of small area. In a specific embodiment of the present invention shown and described herein, a fast radix 4 carry lookahead tree evaluates at the same time that pairs of 8 bit adders evaluate. Each adder pair contains an adder that assumes a carry in of 1 and one with a carry in of zero. A final mux picks the correct result.

Those skilled in the art will recognize that many modifications and variations besides those specifically mentioned may be made in the structure and techniques described herein without departing from the concept of the present invention. For example, the present invention may be generalized to any number n bits. Accordingly, it should be understood that, within the scope of the appended claims, the invention may be practiced otherwise than specifically described herein.

What is claimed is:

1. A high speed adder comprising:
   at least one first independent adder, each of said at least one first independent adder having input means for receiving input operands and output means for outputting a first sum of said input operands, each of said at least one first independent adder assuming a carry in of one;
   at least one second independent adder operable simultaneously with said at least one first independent adder, each of said at least one second independent adder having input means for receiving said input operands and output means for outputting a second sum of said input operands, each of said at least one second independent assuming a carry in of zero;
   carry prediction logic circuitry, said carry prediction logic circuitry producing carries for said at least one first independent adder and said at least one second independent adder and having an output for outputting said produced carries, said carry prediction logic circuitry operable simultaneously with said at least one first independent adder and said at least one second independent adder; and
   solitary sole adder multiplexer means for receiving said outputs of said carry prediction logic circuitry, said at least one first independent adder and said at least one second independent adder, said multiplexer means selecting the proper sums from said first sums produced by said at least one first adder and said second sums produced by said at least one second adder based upon said carries produced by said carry prediction logic circuitry;
   wherein said carry prediction logic circuitry comprises:
   a plurality of substantially similar subcircuits; each of said subcircuits having at least four input terminals, at least two output terminals, and an internal logic circuit; each of said subcircuits being connected in multi-stages to form a three level tree with at least fourteen subcircuits on a first level, four subcircuits on a second level, and two subcircuits on a third level; each of said subcircuits on said first level operable to produce block propagate and generate terms for four inputs on its input terminals; three of said subcircuits on said second level connected in circuit to receive the block propagate and generate terms produced by four subcircuits on said first level and to produce block propagate and generate terms therefrom; the fourth of said subcircuits on said second level connected in circuit to receive the block propagate and generate terms produced by at least two subcircuits on said first level; one of said subcircuits on said third level connected in circuit to receive the block propagate and generate terms produced by the subcircuits on said second level and to produce block propagate and generate terms therefrom; the other of said subcircuits on said third level connected in circuit to receive signals relating to carries from two of said subcircuits on said second level and to further make those signals available as output therefrom.

2. A high speed adder as recited in claim 1, wherein there is a plurality of first adders and wherein there is a plurality of second adders.

3. A high speed adder as recited in claim 1, wherein there are eight first adders, and wherein there are eight second adders.

4. A high speed adder as recited in claim 1, wherein said multiplexer means operates based on a sparse carry principle.

5. A high speed adder as recited in claim 4, wherein said carry prediction logic circuitry employs carry lookahead, carry skip, binary lookahead tree, carry select, or radix 4 tree logic.

6. A high speed adder as recited in claim 5, wherein said carry prediction logic circuitry employs radix 4 tree logic.

7. A high speed adder as recited in claim 1, wherein said input operands are comprised of blocks of bits and wherein said carry prediction logic circuitry further comprises means for predicting carries for said input operand bits corresponding to boundaries of said blocks.

8. A high speed adder as recited in claim 7, wherein said carry prediction logic circuitry is a carry lookahead tree which operates on radix 4.

9. A high speed adder as recited in claim 8 and further comprising means for producing propagate and generate signals, said means for producing propagate and generate signals having input means for receiving said input operands and output means for transmitting said propagate and generate signals to said carry prediction logic circuitry, said at least one first independent adder and said at least one second independent adder.

10. A method of effecting electronic digital addition of first and second operands comprising the steps of:
    adding said first and second operands assuming a carry in of zero;
    simultaneously adding said first and second operands assuming a carry in of one;
    predicting carries simultaneously with a radix 4 carry lookahead tree having a plurality of substantially similar subcircuits, each of said subcircuits having at least four input terminals, at least two output terminals, and an internal logic circuit; each of said subcircuits being connected in multi-stages to form a three level tree with at least fourteen subcircuits on a third level; wherein each level of the tree collects four carries so that carry information from only two of the four level two subcircuits is available at level three; means for collecting carry information from said other two level two subcircuits comprising:
    a subcircuit having at least four input terminals, at least two output terminals, and an internal logic circuit, said subcircuit operable to extract and relay carry information from level two subcircuits that provide such information; and
    means for connecting said subcircuit in circuit so as to receive carry information from said other two level two subcircuits
    whereby said subcircuit uses overlapping information from said second level subcircuits to provide information regarding carries on linear boundaries of said radix 4 carry lookahead tree; and
    selecting with a solitary sole adder multiplexer means a proper result based upon the results of said addition assuming a carry in of zero, said addition assuming a carry in of one, and said predicted carries.

11. A method as recited in claim 10, wherein said addition assuming a carry in of zero is effected by a first plurality of independent adders.

12. A method as recited in claim 11, wherein said addition assuming a carry in of one is effected by a second plurality of independent adders.

13. A method as recited in claim 12, wherein said first plurality of independent adders comprises eight independent adders.

14. A method as recited in claim 13, wherein said second plurality of independent adders comprises eight independent adders.

15. A method as recited in claim 14, wherein said prediction of carries is effected by a radix 4 carry lookahead tree.

16. A method as recited in claim 15, wherein said selection of a proper result is effected by a multiplexer means.

17. A method as recited in claim 16, wherein said multiplexer means comprises an $8 \times (1 \text{ of } 2) \times 8$ multiplexer.

18. A method as recited in claim 10, wherein said input operands are comprised of blocks of bits and wherein the step of predicting carries simultaneously with adding said first and second operands assuming a carry in of zero and adding said first and second operands assuming a carry in of one further comprises the step of predicting carries for said input operand bits corresponding to boundaries of said blocks.

* * * * *